Patented Nov. 3, 1953

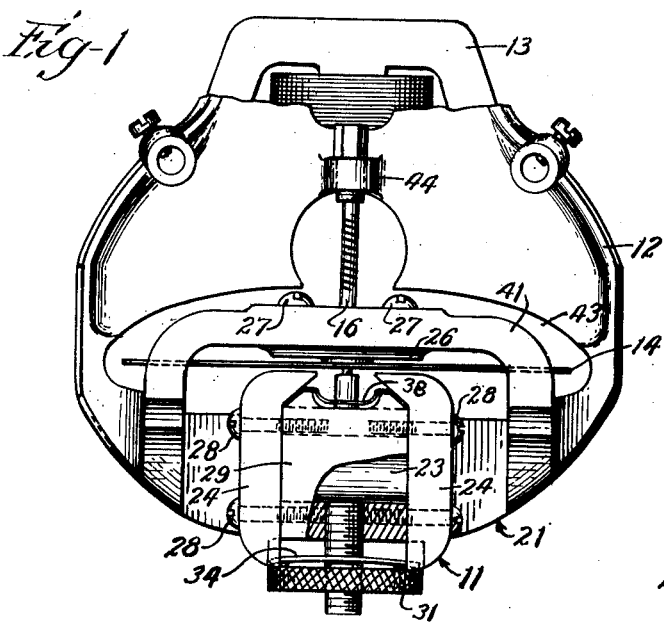

2,658,181

UNITED STATES PATENT OFFICE 2,658,181

DAMPING UNIT FOR METER DISKS

Henry B. Holmes, Lafayette, and Richard A. Road, West Lafayette, Ind., assignors to Duncan Electric Manufacturing Company, Lafayette, Ind., a corporation of Illinois Application June 9, 1948, Serial No. 31,944

6 Claims. (Cl. 324—152)

In watthour meters the disk is mounted on bearings which permit it to rotate with almost no friction. It has no contact with any part of the meter except at the bearings close to the axis of the disk. It is both driven and retarded by magnetism. An electromagnetic driving unit exerts a driving force on the disk which, ideally, is exactly proportional to the power consumption. A damping unit exerts a retarding force on the disk which, ideally, is proportional to its speed.

The damping unit, which is the subject of this invention, conventionally includes a permanent magnet and forms one or more gaps in which the flux from the permanent magnet is concentrated so that the disk rotates through the field or fields of concentrated flux.

It is important to the accuracy of the meter that the flux through the gap remain constant under like conditions throughout the years. It is important to economy that maximum use be made of the magnetism available from the permanent magnet, so far as is consistent with permanent accuracy. High economy of metal helps make economically justifiable the use of more efficient, but expensive, magnetic metals such as Alnico V, sometimes written Alnico 5. Maximum efficiency requires that adjustment be accomplished without increasing the total reluctance beyond that required for the disk gaps. The use of Alnico V requires a structure suitable for applying a magnetic force through the magnet during heat treatment. An object of the present invention is to provide a damping unit which meets these needs better than those previously and which also is inexpensive to manufacture, easy to apply and adjust. For constancy of accuracy it should be relatively immune from weakening as a result of stray fields resulting, for example, when lightning strikes service wires near the meter. By using part of the supporting frame of cast aluminum as a shielding sleeve, it is economically practical to provide greater resistance to weakening by stray fields than had been thought possible before the conception of this invention. By largely protecting the permanent magnet from internal changes in the distribution of flux therein, its permanent accuracy is further ensured.

Subject matter disclosed herein (related to the rearwardly removable disk) is claimed in an application of Richard A. Road, Serial No. 251,229, filed October 13, 1951.

Additional objects and advantages of the invention will be apparent from the following description, and from the drawings in which:

Figure 1 is a fragmentary face view of a meter embodying the present invention.

Fig. 2 is a fragmentary vertical sectional view through the damping unit meter parts.

Fig. 3 is an exploded view of a damping unit embodying the present invention.

Although the law requires a full and exact description of at least one form of the invention, such as that which follows, it is, of course, the purpose of a patent to cover each new inventive concept therein no matter how it may later be disguised by variations in form or additions of further improvements; and the appended claims are intended to accomplish this purpose by particularly pointing out the parts, improvements or combinations in which the inventive concepts are found.

According to the illustrated form of the present invention, the damping unit 11 of this invention is mounted on a meter frame 12 which, in turn, is carried by the driving unit 13 of the watthour meter. A disk 14 is carried by a shaft 16 which may be rotatably mounted by suitable bearings including the upper and lower bearing unit 17. The disk 14 rotates through gaps in the driving unit 13 and the damping unit 11.

Damping unit

The damping unit 11 includes a frame or sub-frame which is formed of a non-magnetic metal and may conveniently be die-cast aluminum. In the illustrated form the main frame 12 serves as the damping unit frame. The latter could be a separate frame, as described in Patent No. 2,252,483, but one advantage of the present invention is in permitting simplification.

The magnetic circuit or path for the damping flux includes a permanent magnet 23, a pair of magnetic yoke members 24 and an armature 26. The yokes 24 and armature 26 are formed of substantially non-retentive or "soft" magnetic metal, such as iron.

The armature 26 is secured to frame 12 by screws 27. The yokes 24 are clamped against the pole faces of permanent magnet 23 by screws 28 which screw into a block 29 of non-magnetic metal. The block 29 is slightly shorter than magnet 23 so that firm contact between the magnet 23 and the yokes 24 is ensured. The block 29 could be a separate block secured to the frame 12 by screws extending through the back of the frame 12 and into the block 29. Preferably, however, it is cast integrally with the frame 12. Hence it is formed of aluminum.

The heavy aluminum block, because of its good electrical conductivity, serves as a shielding sleeve to reduce the effects of stray fields due to surges of current resulting from the striking of supply wires by lightning. In fact, the illustrated form of damping unit has been found to be surprisingly far superior to prior damping units in its resistance to weakening by stray fields. Various factors contribute to this. One is a heavy body of aluminum forming a closed circuit around the girth of the magnet 23. Another is that not any of the magnet 23 is left completely unprotected.

According to the present invention, the constant accuracy of the damping unit is further ensured by maintaining a practically unchanging flux pattern in the permanent magnet 23. This unchanging flux pattern results from the fact that the permanent magnet 23 is well separated from any part of the magnetic path of varying permanence. In fact, it may be regarded as a part of the present invention to recognize that in many prior damping units the shifting flux paths adjacent the poles of the magnets under varying conditions have caused some loss of accuracy. Such shifting of the flux path was caused chiefly by calibrating adjustments.

In connection with the calibrating adjustment, it is important that this avoid increasing the air gap length in the magnetic circuit beyond that required for the disk. It is believed this has been accomplished before only at the expense of either moving the unit as a whole or applying shunts at points where the flux pattern of the magnet was undesirably changed.

According to the present invention, the unchanging yokes 24 are in magnetic contact with the ends of the permanent magnet 23 so that substantially all of the flux available from the permanent magnet 23 flows directly into the yokes 24. No changes in the magnetic path cause any substantial departure from this constant path. The calibrating adjustment is made by a shunt 31 which is spaced substantially below the permanent magnet 23. This satisfies two important considerations: (a) This source of variation is spaced substantially from the permanent magnet 23 so that the path of flux within the magnet remains substantially constant. In other words, the poles of permanent magnet 23 both constantly engage non-retentive, high permeability magnetic metal, so that variations in leakage flux are largely in the non-retentive iron where no permanent change is produced. (b) The reluctance of the total magnetic circuit is never increased above that caused by the disk-receiving gaps. The shunt 31 reduces reluctance rather than increasing it. Greater reluctance would require a longer permanent magnet for the same high stability.

The adjusting shunt 31 may comprise a simple disk of substantially non-retentive iron which may be turned to screw up or down on a threaded non-magnetic stud 32 secured in block 29. It may be secured in position in casting the sub-frame 12 or it may be driven or screwed therein subsequently. Preferably some means is provided for creating enough friction between the disk 31 and the stud 32 so that there will be no accidental relative movement due to vibration or the like. This may be accomplished, for example, by a threaded spring strip of washer 34 which is under resilient tension in the operating condition. Rotation between the spring 34 and disk 31 may be prevented by friction or by recesses 36 on disk 31, engaged by deformations on spring 34.

If desired, disk 31 may be provided with radial slots adapted to receive a screw driver for facilitating turning disk 31. The disk is so readily accessible from the front of the meter, however, that turning it by contact with the thumb is believed to be satisfactory.

The conventional temperature compensation may be provided by a temperature compensating strip 38 of a metal having a negative temperature coefficient of permeability. This strip may be positioned as shown or it may be associated with the adjustment member 31. It may also be positioned beside the permanent magnet 23 within the block 29. This is making slightly less than theoretically perfect use of the inventive concept of an unchanging flux path in the magnet 23, but the percentage of variation produced by the compensator 38 is so low that this departure from the ideal of an unchanging flux path is not too great.

Some of the advantages of the invention can be obtained with other magnet arrangements. For example, the heavy shielding made possible by casting or otherwise mold-forming the shield as a magnet-supporting part of the frame can be used with a vertical magnet, even though this would, it is now believed, be making less than perfect use of the invention.

Some further details, although subject to wide variations, may be helpful. The pole pieces or yokes 24 may be made of cast iron, although forgings of relay steel are preferred. The cross-section chosen will naturally be the optimum, considering cost as well as adequacy. In other words, the size should be large enough to give adequate damping with almost the smallest magnet that can be used as shown to yield this required damping. A substantially larger cross-section, which merely permits a trifling reduction of magnet size, would be uneconomical. The magnet 23 is preferably Alnico V, unless a better magnet material be developed, and may be of rectangular cross-section, although the round cross-section shown is at present preferred. Alnico V has the following composition: Aluminum 8%, nickel 14%, cobalt 24%, copper 3%, balance iron. The production of this magnet requires cooling it through a critical temperature range while subjected to a strong magnetic field.

Other permanent magnet materials may be used. Of course, any magnet inferior to Alnico V is failing to make full use of the invention, but the important shielding and flux uniformity features may nevertheless be attained by the use of some aspects of the invention. Because one of the purposes is to make feasible the use of substantially better magnetic material than used for meter disk damping heretofore, it is noted that this feature contemplates a material at least capable of retaining a flux density of six kilograms under a demagnetization force of 300 oersteds.

Although the features already discussed provide an exceptionally simple form of damping magnet unit, there are other considerations which affect the question of simplicity. It is highly desirable that the entire damping unit be mounted in such a way that it may be applied to the disk or removed therefrom without disturbing the damping unit. This is desirable both in original assembly and in servicing the meter. Heretofore this has most commonly been accomplished by mounting the damping unit on a separate frame removable from the main frame on which the disk rotated. With such a construction the present invention contemplates that the aluminum block 29 would be part of the separable frame carrying the damping unit. Greater simplicity is provided, however, by making the block 29 part of the main frame and having no separable frame. This reduces the number of parts, but also facilitates providing the parts of such accurate dimensions and relationship that the disk will be properly centered in the disk gap without special features of adjustability. According to the present invention this is accomplished by forming the block 29 on the main frame, providing a bracket 41 from the main frame for supporting the armature 26, and providing an aperture 43 through the main frame of such dimensions that the disk can be removed rearwardly from the main frame after the main frame has first been removed from the driving unit 13. The armature 26 is believed to be more sturdily supported from the portion of the frame below the disk in this manner than would be possible with the same amount of metal extending from the frame above the disk, and it leaves more free space above the disk. From Fig. 1 it is seen that the aperture 43 is wider than the disk 14 and extends upwardly to the upper bearing support 44. The vertical extent of the aperture 43 is best seen in Fig. 2, from which it is apparent that it extends not only to the upper bearing support 44, but to the lower bearing support 46. The bearing assembly 18 includes an upwardly projecting portion 47, the removal of which, with the bearing assembly 18, gives plenty of clearance for the removal of the meter disk after removal of upper bearing assembly 17.

We claim:

1. A damping unit for watthour meters including non-permanent magnetic members forming at least one gap for reception of a meter disk, a permanent magnet engaging at least some of said non-permanent magnetic members at points substantially spaced from said gap and forming a magnetic circuit with said magnetic members to force magnetic flux through said gap, and at least one additional magnetic means extending variably between said magnetic members in a magnetic path independent of said gap for providing calibrating adjustment and temperature compensation, said additional magnetic means being spaced substantially from the permanent magnet.

2. A damping unit for rotating elements of measuring instruments including a pair of pole-forming yoke members having poles adapted to face one face of a disk, an armature adapted to face the opopsite face of the disk and form gaps with said pole faces, a permanent bar magnet having its end faces forming opposed poles engaging said yoke members at points substantially spaced from the pole faces thereof, a sleeve of non-magnetic metal of good conductivity surrounding said permanent magnet, and means securing said yoke members to said sleeve, the dimensions being such that said yoke members are thereby held firmly against said permanent magnet, said yoke members being formed of substantially non-retentive magnetic metal; said sleeve being an integral part of a cast frame supporting said damping unit.

3. A damping unit for the measuring retardation of a moving element of a measuring instrument, including a permanent magnet the end faces of which comprise poles, a pair of non-permanent magnetic extensions, one substantially covering each end pole face of the magnet, a non-permanent magnetic armature spaced from each of said extensions to form gaps therewith adapted to receive said moving element, said gaps being close to one another to provide closely spaced opposed fields through which the moving element moves in succession, and at least one additional shunt means of magnetizable material extending variably between said magnetic extensions relatively remotely from the magnet and independently of said gaps for providing calibrating adjustment.

4. A damping unit for watthour meters including a permanent magnet having magnetically opposed pole faces, substantially non-permanent magnetic means forming a path between the faces with at least one disk-receiving gap therein and including extensions of substantially non-permanet magnetic metal adjacent each face of the permanent magnet, and shunt means of magnetizable material shiftably positioned to variably shunt predominantly between said extensions.

5. A damping unit for the measuring retardation of a moving element of a measuring instrument, including a permanent magnet, a pair of non-permanent magnetic extensions, each substantially covering one end pole face of the magnet, a non-permanent magnetic armature spaced from a face of each of said extensions to form gaps therewith adapted to receive said moving element and adjustable shunt means of magnetizable material acting predominantly between said extensions for adjusting said damping unit as to the flux traversing said gaps while maintaining constant the reluctance of the magnetic circuit from one pole face through said gaps and said armature to the other pole face.

6. A damping unit for the measuring retardation of a moving element of a measuring instrument, including a permanent magnet, a pair of non-permanent magnetic extensions, one substantially covering each end pole face of the magnet, a non-permanent magnetic armature spaced from a face of each of said extensions to form gaps therewith adapted to receive said moving element, said gaps being close to one another to provide closely spaced opposed fields through which the moving element moves in succession, and adjustable shunt means of magnetizable material acting predominantly between said extensions magnetically for adjusting said damping unit as to the flux traversing said gaps while maintaining constant the reluctance of the magnetic circuit from one pole face through said gaps and said armature to the other pole face.

HENRY B. HOLMES.
RICHARD A. ROAD.

References Cited in the file of this patent

UNITED STATES PATENTS

| Number | Name | Date |
|---|---|---|
| 590,653 | Thomson | Sept. 28, 1897 |
| 2,196,898 | Faus | Apr. 9, 1940 |
| 2,209,236 | Rowell | July 23, 1940 |
| 2,236,277 | Sturtevant | Mar. 25, 1941 |
| 2,284,893 | Barnes | June 2, 1942 |
| 2,323,465 | Green | July 6, 1943 |
| 2,401,730 | Green | June 11, 1946 |

FOREIGN PATENTS

| Number | Country | Date |
|---|---|---|
| 539,632 | France | Apr. 5, 1922 |
| 453,262 | Great Britain | Sept. 8, 1936 |
| 536,707 | Great Britain | May 23, 1941 |